(No Model.) 2 Sheets—Sheet 2.
W. GOWEN.
SAW MILL CARRIAGE.
No. 369,518. Patented Sept. 6, 1887.
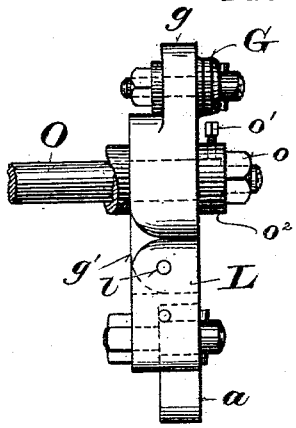
Fig. 3.
Fig. 5.
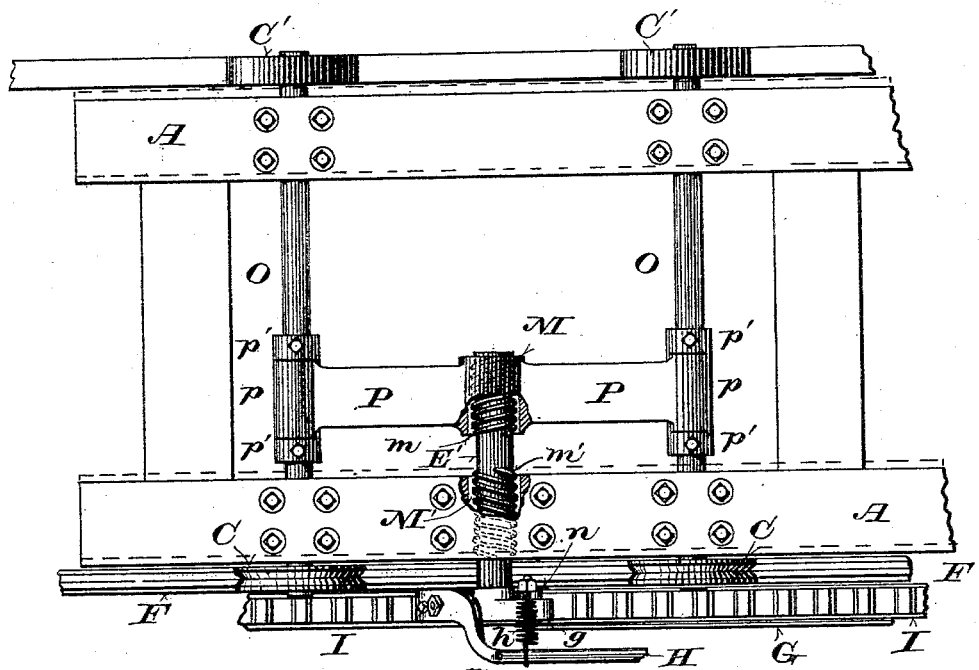
Fig. 4.
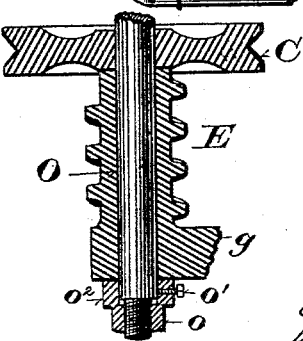
Witnesses:
Chas. L. Goss.
August Lindemann.
Inventor,
William Gowen

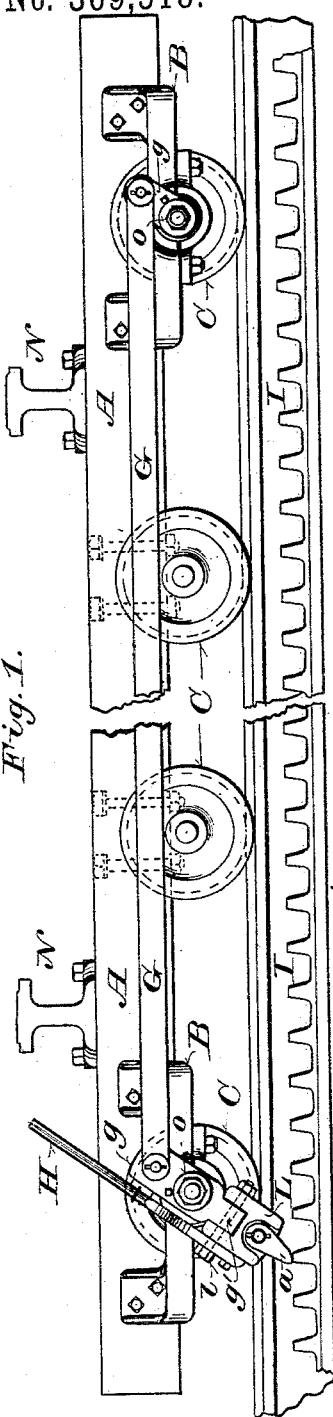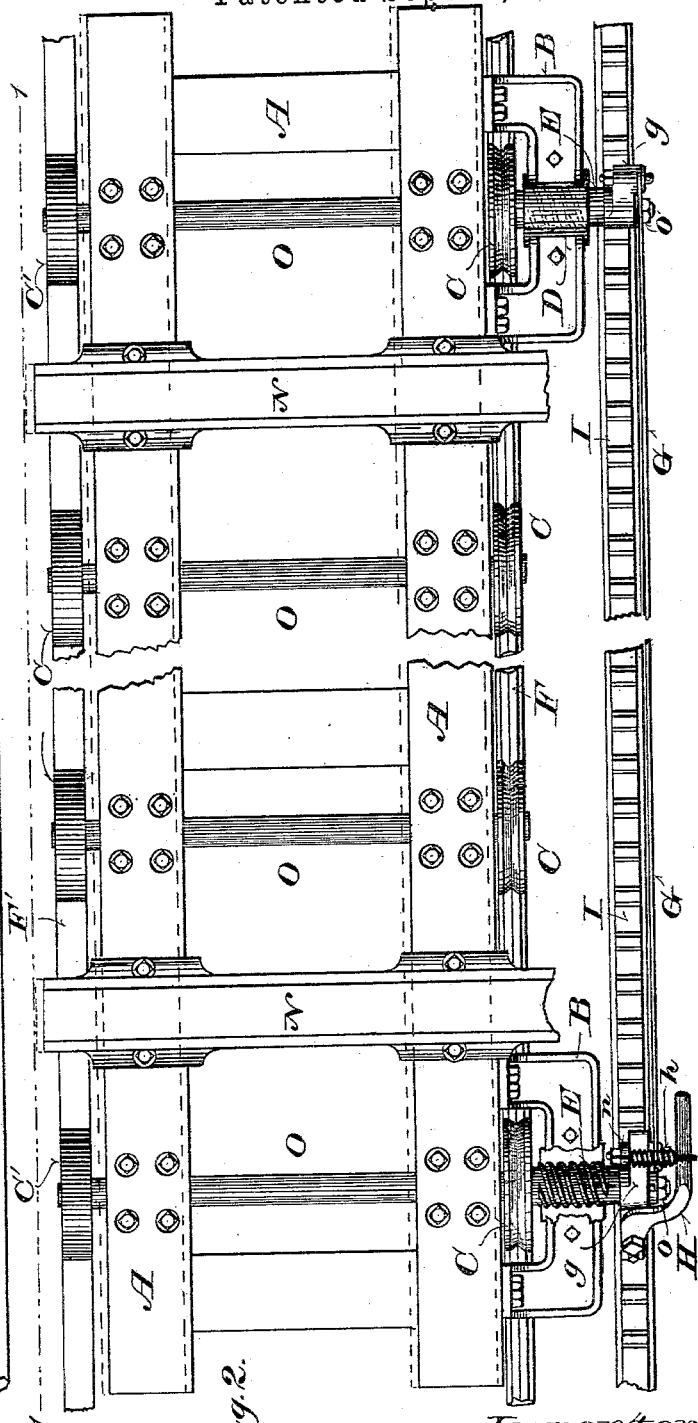

UNITED STATES PATENT OFFICE.

WILLIAM GOWEN, OF WAUSAU, WISCONSIN.

SAW-MILL CARRIAGE.

SPECIFICATION forming part of Letters Patent No. 369,518, dated September 6, 1887.

Application filed July 29, 1886. Serial No. 209,365. (No model.)

*To all whom it may concern:*

Be it known that I, WILLIAM GOWEN, a citizen of the United States, residing at Wausau, in the county of Marathon and State of Wisconsin, have invented certain new and useful Improvements in Saw-Mill Carriages; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates to that class of saw-mill carriages in which the log-supports are shiftable laterally in reference to the saw-cut; and it consists, essentially, of a log frame or supports laterally adjustable upon the trucks, offset mechanism for shifting said frame or supports, an automatic tripping device for reversing said shifting mechanism, and of certain details hereinafter described. Its object is to move the log away from the saw in "gigging back."

In the accompanying drawings like letters designate the same or similar parts in the several figures.

Figure 1 is a side elevation of a saw-mill carriage embodying my improvements. Fig. 2 is a plan view of the same. Fig. 3 is an elevation, on an enlarged scale, taken at right angles to the view shown in Fig. 1, of one of the screw-actuating cranks, pivoted pawl-block, and gravitating pawl. Fig. 4 is a horizontal median section, on an enlarged scale, of one of the shifting-screws and the parts therewith associated; and Fig. 5 is a plan view of one end of a carriage, showing a modified form of my improved offset mechanism.

A A is the carriage-frame, of the usual construction, and upon which are supported in the usual manner head-blocks N N. The frame A is supported and arranged to travel upon wheels C C', which are mounted upon axles O O and run upon the tracks F F', laid parallel with the plane of the saw. (Represented by the line 1 1, Fig. 2.)

Upon the side of the carriage adjacent to the saw I have shown wheels C' C', having plain faces, and a track, F', having a corresponding face, and upon the opposite side of the carriage wheels C C, having grooved faces and an inverted-V-shaped track, F, upon which said grooved wheels travel and by which the carriage is guided. I may, however, employ any other suitable form of carriage-wheel and track. E E are screws formed with the crank-arms $g$ $g$, and centrally perforated to receive the ends of the axles O O, which are extended and projected through said screws, and are threaded at their protruding ends, as shown in Fig. 4, to receive the retaining-nuts $o$ $o$.

To the side of the carriage-frame A, opposite the saw, are secured the brackets B B, which are provided with the internally-threaded boxes D D, in which said screws E E are arranged to work. The nuts $o$ $o$ are formed integral with collars $o^2$ $o^2$, which are bored out to receive the ends of axles O O, as shown in Fig. 4, and are secured in place by set-bolts $o'$ $o'$. The screws E E bear at one end against the hubs of the adjacent wheels C C and at the other end against the collars $o^2$ $o^2$, which may be turned up by means of their squared ends or the nuts $o$ $o$, to take up wear or lost motion, the ends of said axles being reduced and threaded sufficiently to permit of said collars being brought snugly up against the ends of said screws E.

The arms $g$ $g$ of screws E are connected by the rod G, so as to cause said screws to be operated simultaneously. The front or outer end of one of the screws E is provided on the under side with a transversely-perforated tongue or ear, $g'$, to which is pivoted the pawl-block L by means of the bolt $l$, as seen in Figs. 1 and 3. The pawl-block L is recessed to receive and limit the movement of the gravitating pawl $a$, pivoted thereto.

To the floor or frame-work of the mill is secured, parallel with the track F, the rack I in the line of movement of said gravitating pawl $a$, which engages therewith, as seen in Fig. 1. To the pawl-block L is bolted a lever, H, by means of which the pawl $a$ may be swung out of engagement with the rack I whenever it is desired. A spring, $h$, attached at one end to an ear, $n$, on arm $g$ and at the other end to lever H, retains the pawl $a$, when said lever is released, in engagement with said rack I. The outer edges of the adjacent ends of the tongue $g'$ and the pawl-block L, being squared, as seen in Fig. 3, limit the outward movement of said pawl-block and the gravitating pawl *a*, and prevent the retracting-spring *h* from forcing said pawl out of contact with rack I.

I do not wish to limit myself herein to the precise construction shown in Figs. 1 and 2, since any adaptation of the screw to a log-support laterally adjustable with reference to the line of travel of the carriage or the saw-cut as a means for shifting the log away from the saw in gigging back comes within the spirit of my invention.

In Fig. 5 is illustrated one of various modifications of the screw and its connections with the carriage by means of which the same end may be accomplished. E' represents a screw having a right and left thread, *m' m*, one of which works in an internally screw-threaded box, M', secured to the carriage-frame A, and the other works in a similar box, M, formed in the cross-head P, which is provided at its ends with the sleeves *p p*. The axles O O of the carriage-truck pass through and turn in said sleeves *p p*, at each end of which collars *p' p'* are secured upon said axles. The screw E' is formed at its outer end with the crank-arm *g*, by means of which it is connected by the rod G with a like device at the other end of the carriage. (Not shown.) To one of these screws is applied the pivoted pawl-block L and gravitating pawl *a*, which works in a rack, I, the details of which have been hereinbefore described.

The screws E E may be applied, as previously described, to the axles O O at the ends of the carriage, or to any other two or more of said axles, as may be convenient or desired.

When desired, one of the arms *g* may be formed with a socket to receive a hand-lever for operating the shifting-screws by hand instead of by the automatic reversing device herein described.

My improved offset mechanism operates as follows: When the carriage is started forward, the pawl *a* drops between two adjacent teeth of rack I, and throws the arms *g g* to the left, as seen in Fig. 1, giving the screws E E a partial revolution in that direction and moving the carriage-frame A toward the saw into the position indicated by dotted lines in Fig. 2. The pawl *a* then drags loosely over the rack I as the carriage advances until its movement is reversed. As the carriage begins to gig back, the pawl drops into the rack, as before described, and, engaging with the adjacent tooth, carries arms *g g* to the right, moving the carriage-frame in the same manner away from the saw, and carrying the log out of contact therewith while said carriage makes its return movement. The operation is then repeated, as described.

Whenever it is desired to run the carriage back before the saw has completed its cut, the pawl *a* is thrown out of engagement with rack I by carrying lever H outward or away from the carriage.

I do not claim herein the combination, with a guiding-track, of a log-supporting frame, its supporting axles and wheels, and a hand-lever connecting said log-supporting frame and axles, and adapted to move said log-supporting frame independently of the carriage feeding mechanism lengthwise of said axles, but make that the subject-matter of an application for United States Letters Patent filed December 27, 1886, No. 222,607.

I claim—

1. The combination, with a guiding-track, of a saw-mill carriage having its supporting-wheels mounted upon said track, a log-frame movable upon the axles of said wheels transversely to the line of travel of said carriage, screws acting transversely to said track on said axles and on said log-frame, internally-threaded boxes or nuts working with said screws and secured to said log-frame or to said axles, and means for turning said screws and thereby moving said frame lengthwise of said axles, substantially as and for the purposes set forth.

2. The combination, with a guiding-track, of a saw-mill carriage having its supporting-wheels mounted upon said track, a log-supporting frame mounted upon and movable lengthwise of the axles of said wheels, connected screws acting simultaneously transversely to said guiding-track on said axles and on said log-frame, threaded boxes or nuts secured to said axles or frame, and means for turning said screws and thereby moving said frame laterally lengthwise of said axles, substantially as and for the purposes set forth.

3. In combination with a saw and track by the side thereof, a log-carriage movable upon the track past the saw, a rack or rail set parallel with said track, offsetting mechanism for moving the log-frame toward and from the saw, and an arm connected with the offsetting mechanism journaled on the carriage and movable in the direction of its travel and working with said rack or rail, whereby when the travel of the carriage is reversed said arm is caused to swing to one or the other side of its journal to actuate the offsetting mechanism, substantially as and for the purposes set forth.

4. The combination, in a saw-mill carriage, of the log-support laterally movable with reference to the line of travel of said carriage, a screw, E, applied thereto and arranged to shift said log-support laterally, and an automatic trip arranged to operate said screw alternately in opposite directions whenever the movement of said carriage is reversed, substantially as and for the purposes set forth.

5. The combination, in a saw-mill carriage, of the wheels C C' and axles O O, the log-supporting frame A, laterally movable thereon with reference to the line of travel of said carriage, screws E E, mounted upon axles O O and working in internally screw-threaded boxes D D, which are secured to said frame A, and mechanism for operating said screws, substantially as and for the purposes set forth.

6. The combination of the log-supporting frame A, mounted and laterally movable upon wheels C C' and axles O O, brackets B B, secured to said frame A and provided with internally screw-threaded boxes D D, screws E E, mounted upon said axles and working in said boxes D D, cranks $g$ $g$, and connecting-rod G, substantially as and for the purposes set forth.

7. The combination, in a saw-mill carriage, of the log-supporting frame A, laterally movable upon its trucks with reference to the line of travel of said carriage, shifting-screws E E, applied thereto, pawl $a$, and rack I, arranged to operate said screws when the movement of the carriage is reversed, substantially as and for the purposes set forth.

8. The combination, in a saw-mill carriage, of the log-supporting frame A, laterally movable upon its trucks with reference to the line of travel of said carriage, shifting-screw E, applied thereto, pawl-block L, pivoted to said screw, gravitating pawl $a$, pivoted to said block, and rack I, substantially as and for the purposes set forth.

In testimony that I claim the foregoing as my own I affix my signature in presence of two witnesses.

WILLIAM GOWEN.

Witnesses:
   CHAS. L. GOSS,
   AUGUST LINDEMANN.